(12) United States Patent
Shinmura et al.

(10) Patent No.: US 7,402,926 B2
(45) Date of Patent: Jul. 22, 2008

(54) ACTUATOR DEVICE

(75) Inventors: Naohisa Shinmura, Iwata (JP);
Naohiko Shibata, Hamamatsu (JP);
Yukinobu Kujira, Toyohashi (JP)

(73) Assignee: Asmo Co., Ltd, Shizuoka-Ken (JP)

( * ) Notice: Subject to any disclaimer, the term of this patent is extended or adjusted under 35 U.S.C. 154(b) by 137 days.

(21) Appl. No.: 10/533,896

(22) PCT Filed: Nov. 6, 2003

(86) PCT No.: PCT/JP03/14147

§ 371 (c)(1),
(2), (4) Date: Oct. 11, 2005

(87) PCT Pub. No.: WO2004/047257

PCT Pub. Date: Jun. 3, 2004

(65) Prior Publication Data

US 2006/0096400 A1    May 11, 2006

(30) Foreign Application Priority Data

Nov. 8, 2002 (JP) ............................. 2002-325216
Nov. 8, 2002 (JP) ............................. 2002-325745

(51) Int. Cl.
*H02K 7/116* (2006.01)
*H02K 11/00* (2006.01)

(52) U.S. Cl. .................... 310/83; 310/71; 310/68 B; 310/75 R

(58) Field of Classification Search ............ 310/68 B, 310/67 R, 71, 75 R, 80, 83
See application file for complete search history.

(56) References Cited

U.S. PATENT DOCUMENTS 4,795,867 A * 1/1989 Ohi et al. ............... 200/37 R
5,777,410 A * 7/1998 Asakura et al. ............ 310/71
6,294,851 B1 * 9/2001 Matsuyama et al. ........ 310/43

FOREIGN PATENT DOCUMENTS

| EP | 617213 A1 * | 9/1994 |
|---|---|---|
| JP | 54-101274 | 7/1979 |
| JP | 59-105649 | 7/1984 |
| JP | 3-183338 | 8/1991 |
| JP | 04-315987 | 11/1992 |
| JP | 5-39168 | 5/1993 |
| JP | 5-95177 | 12/1993 |
| JP | 9-107658 | 4/1997 |
| JP | 9-308188 | 11/1997 |
| JP | 10-009367 | 1/1998 |
| JP | 11-103560 | 4/1999 |
| JP | 2002-267407 | 9/2002 |
| WO | WO 01/80407 A1 | 10/2001 |

* cited by examiner

*Primary Examiner*—Burton Mullins
(74) *Attorney, Agent, or Firm*—Boyle Fredrickson, S.C.

(57) ABSTRACT

An actuator device includes a drive motor, a reduction mechanism, which includes gears, an output shaft coupled to the reduction mechanism, and a connector assembly. The connector assembly includes a sensor accommodating portion for accommodating a sensor, which detects the rotation angle of the output shaft, and a connector portion, which includes connector pins connected to an external connector, and a power supply portion, which includes power supply terminals connected to the drive motor. The sensor accommodating portion, the connector portion, and the power supply portion are integrally formed. The power supply terminals and the connector pins are formed of a single conductive plate. The connector assembly is molded using resin to integrally incorporate the conductive plate. As a result, the actuator device that is easily assembled is obtained.

20 Claims, 12 Drawing Sheets

ACTUATOR DEVICE

FIELD OF THE INVENTION

The present invention relates to an actuator device equipped with a drive motor.

BACKGROUND OF THE INVENTION

Japanese Laid-Open Patent Publication No. 9-219957 discloses an actuator device equipped with a drive motor, a reduction mechanism including gears, and an output shaft. Rotation of the drive motor is transmitted to the output shaft via the reduction mechanism, thereby driving a driven device coupled to the output shaft. The actuator device also includes a power supply terminal connected to the drive motor, a sensor for detecting the rotational angle position of the output shaft, and connector pins connected to an external connector. Drive current is supplied to the drive motor from the outside and rotational angle signals obtained by the sensor are sent to the outside through the external connector.

The connector pins are held between an upper case and a lower case, which form a connector housing. The power supply terminal is located on a first conductive plate and the connector pins are located on a second conductive plate. After the second conductive plate is crimped to the first conductive plate, spot welding is performed so that the first and second conductive plates are coupled to each other. A patterned substrate forming part of the sensor is adhered to one of gears forming the reduction mechanism. A brush connected to the first conductive plate slides against the patterned substrate.

The actuator device has the following drawbacks. That is, since the connector pins are held between the upper case and the lower case, which form the connector housing, it takes time to accurately arrange the connector pins at a predetermined position in the connector housing. Also, since the first conductive plate, which has the power supply terminal, needs to be coupled to the second conductive plate, which has the connector pins, maintenance and assembly of the two conductive plates are complicated and troublesome. Furthermore, it is difficult to check the contact state between the patterned substrate adhered to the gear and the brush. As a result, it takes a lot of trouble to assemble the actuator device of the above publication.

Like the above publication, Japanese Laid-Open Patent Publication No. 9-308188 discloses an actuator device equipped with a drive motor, a reduction mechanism including gears, and an output shaft. According to the actuator device of the publication No. 9-308188, one of the gears (except a worm attached to a rotary shaft of the drive motor) forming the reduction mechanism is pressed in the axial direction by a spring washer. The pressure on the gear applies force on the rotary shaft of the drive motor along a direction that intersects the axial direction of the rotary shaft. As a result, backlash of the rotary shaft is suppressed.

In the above publication, a special spring washer is provided to press one of the gears in the axial direction. Therefore, manufacture and an assembling process of the spring washer are required, which increases the manufacturing cost of the actuator device.

SUMMARY OF THE INVENTION

Accordingly, it is an objective of the present invention to provide an actuator device that is easily assembled.

To achieve the above objective, an actuator device of the present invention includes a drive motor, a power transmission mechanism coupled to the drive motor, and an output shaft coupled to the power transmission mechanism. Rotation of the drive motor is transmitted to the output shaft via the power transmission mechanism. The actuator device also includes a sensor for detecting the rotation angle of the output shaft, a connector terminal connected to an external connector, and a power supply terminal, which is connected to the drive motor and supplies electric power to the drive motor. The sensor, the connector terminal, and the power supply terminal are electrically connected to one another. Electric power is supplied to the drive motor from the outside and a rotation angle signal obtained by the sensor is sent to the outside via the external connector and the connector terminal. The actuator device further includes a sensor accommodating portion for accommodating the sensor, a connector portion including the connector terminal, and a power supply portion including the power supply terminal. The sensor accommodating portion, the connector portion, and the power supply portion are integrally formed.

In another aspect of the present invention, an actuator includes a drive motor, a power transmission mechanism coupled to the drive motor, and an output shaft coupled to the power transmission mechanism. Rotation of the drive motor is transmitted to the output shaft via the power transmission mechanism. The actuator device also includes a sensor for detecting the rotation angle of the output shaft, a connector terminal connected to an external connector, and a power supply terminal, which is connected to the drive motor and supplies electric power to the drive motor. Electric power is supplied to the drive motor from the outside and a rotation angle signal obtained by the sensor is sent to the outside via the external connector and the connector terminal. The actuator device further includes a sensor accommodating portion for accommodating the sensor, a connector portion including the connector terminal, and a power supply portion including the power supply terminal. The sensor accommodating portion, the connector portion, and the power supply portion are integrally formed. The connector portion is held by a first case and a second case.

In a further aspect of the present invention, an actuator device includes a drive motor, which has a rotary shaft, a motor gear attached to the rotary shaft, a plurality of gears forming a series of gears coupled to the motor gear, and an output shaft coupled to the series of gears. Rotation of the rotary shaft is transmitted to the output shaft via the series of gears. At least one of the gears, which form the series of gears, integrally includes a depression portion, which depresses the gear in the axial direction. The depression portion applies load on the rotary shaft in a direction that intersects the axis of the rotary shaft.

DETAILED DESCRIPTION OF THE PREFERRED EMBODIMENTS

A vehicle air-conditioning system according to one embodiment of the present invention will now be described with reference to the drawings.

Figure 15:
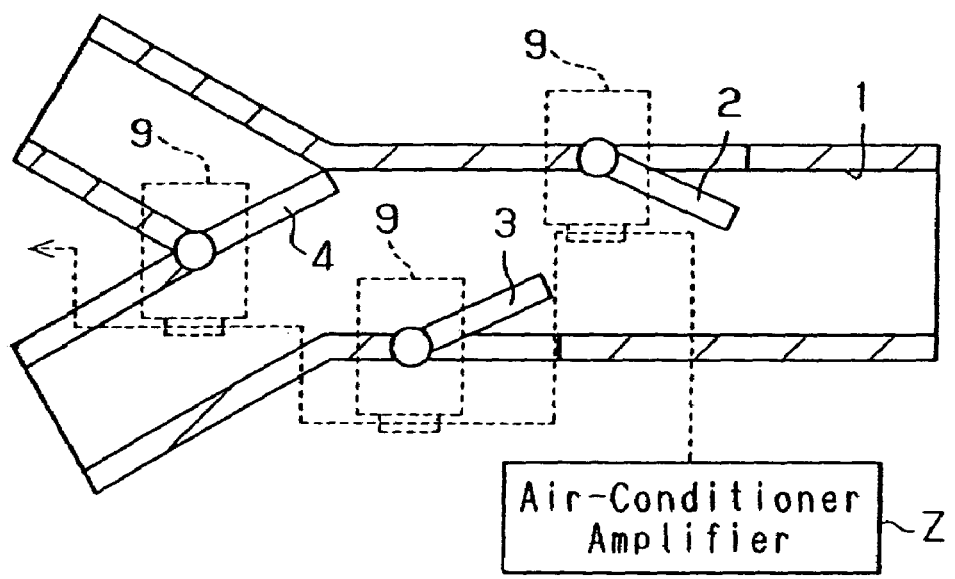
FIG. 15 is a schematic cross-sectional view illustrating a passage for an air-conditioning system.

As shown in FIG. 15, the air-conditioning system includes a passage 1 for an air-conditioning system to permit air to flow. The passage 1 for an air-conditioning system is provided with dumpers (three dumpers in FIG. 15) 2, 3, and 4. The dumpers 2 to 4 control the flow of air in the passage 1. For example, the dumpers 2 to 4 switch the air inlet to introduce the outside air or to circulate air within the passenger compartment. Alternatively, the dumpers 2 to 4 selectively open and close air outlets for ventilation, footwell, and defroster. Each dumper 2 to 4 is provided with an actuator device 9. Each actuator device 9 drives the corresponding dumper 2 to 4 in accordance with a control signal and electric power supplied from an air-conditioner amplifier Z.

Figure 13:
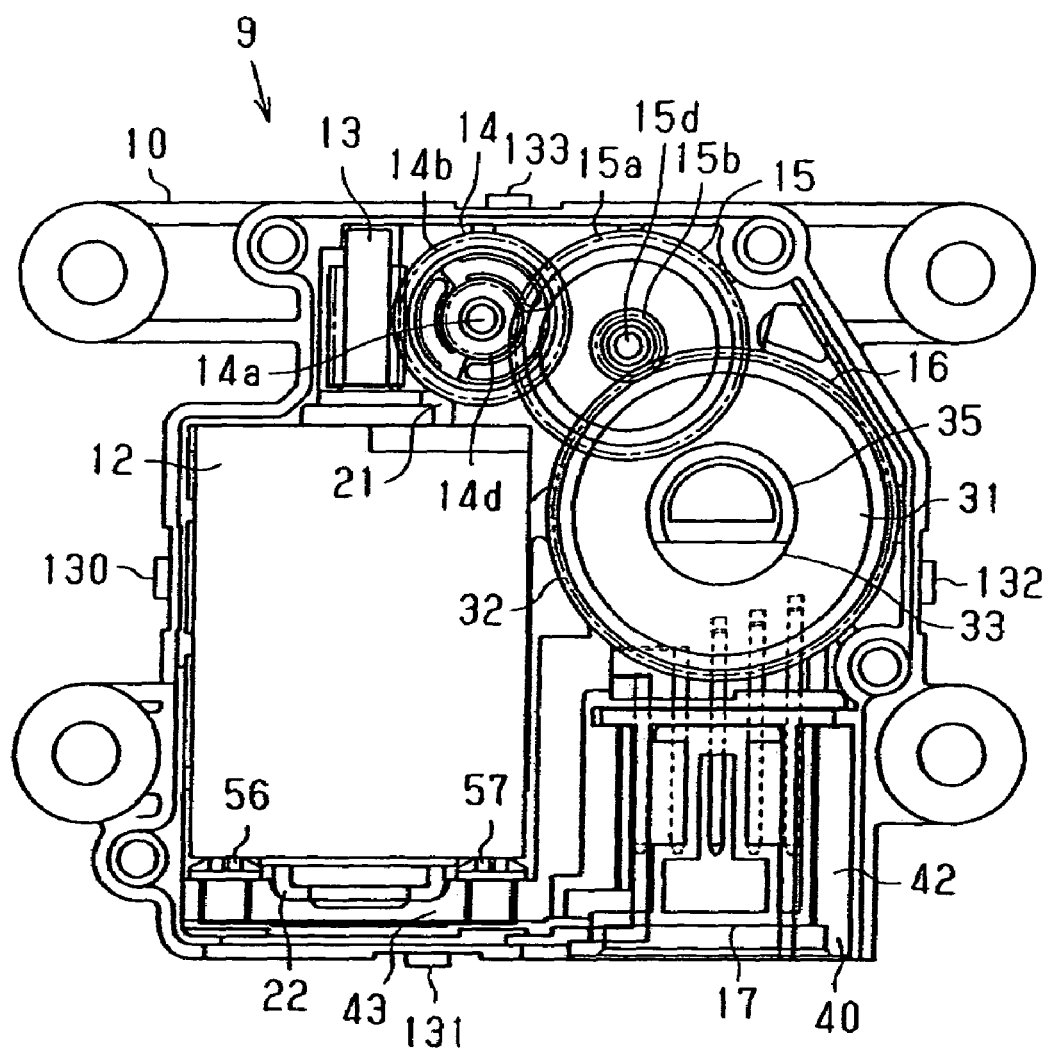
FIG. 13 is a plan view illustrating the actuator device from which the upper case is detached.
Figure 14:
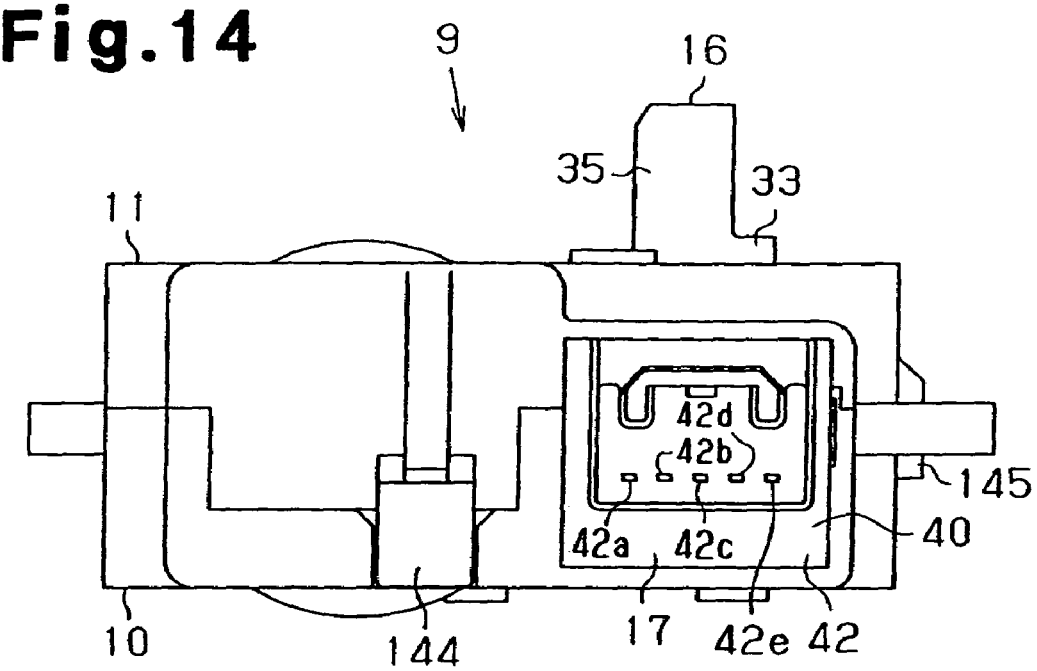
FIG. 14 is a front view illustrating the actuator device.

One of the actuator devices 9 will now be described below. As shown in FIG. 14, a housing of the actuator device 9 is formed by assembling a first case, which is a lower case 10 in this embodiment, and a second case, which is an upper case 11 in this embodiment. As shown in FIG. 13, the actuator device 9 also includes a drive motor 12, a worm 13, which is a gear, first, second, and third reduction gears 14, 15, and 16 forming a series of gears, and a connector assembly 17. The worm 13 and the first to third reduction gears 14 to 16 form a power transmission mechanism, or more specifically, a reduction mechanism.

Figure 11:
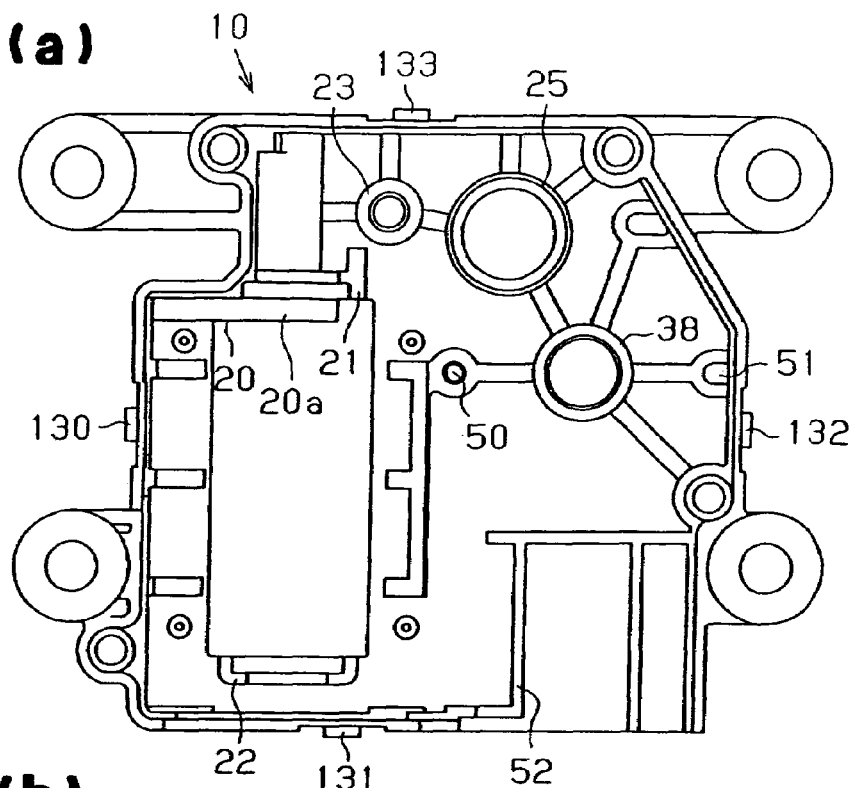
FIG. 11(a) is a front view illustrating the lower case.
FIG. 11(b) is a front view illustrating the lower case shown in FIG. 11(a)
FIG. 11(c) is a partial perspective view illustrating the lower case shown in FIG. 11(a)
Figure 11:
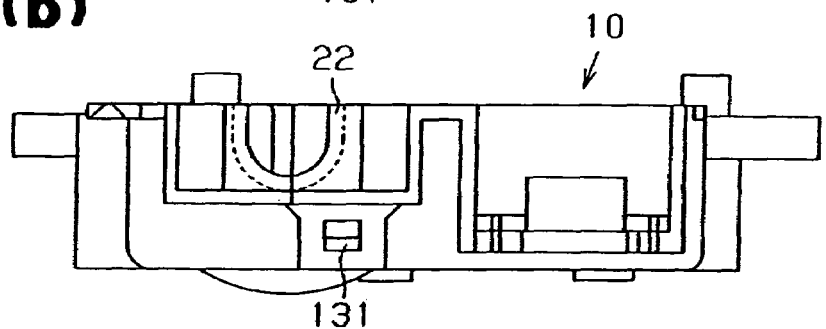
Figure 11:
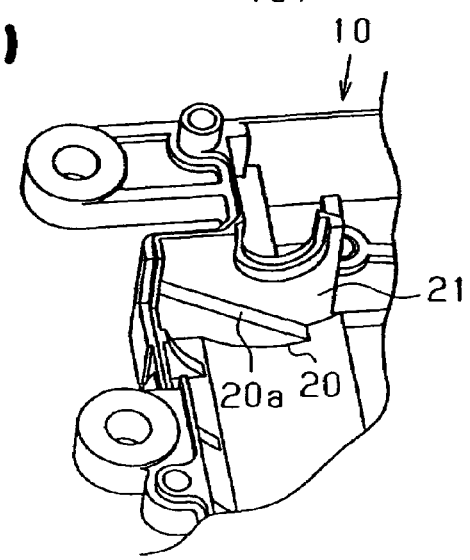

As shown in FIGS. 11(a) to 11(c), an inclined portion 20 and a pair of motor support portions 21, 22 are formed in the lower case 10. The inclined portion 20 projects upward from the bottom wall of the lower case 10 and has an end face 20a, which inclines with respect to the bottom wall of the lower case 10. The motor support portions 21, 22 project upward from the bottom wall of the lower case 10. The motor support portions 21, 22 hold and secure the drive motor 12 therebetween.

Figure 3A:
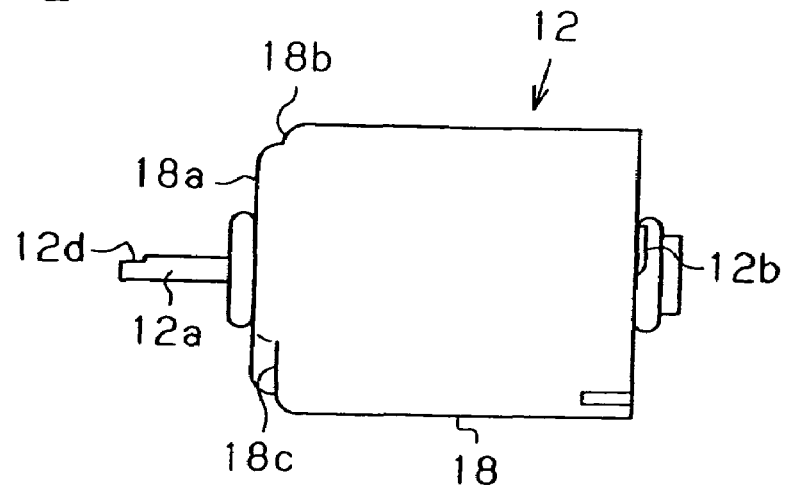
FIG. 3(a) is a front view illustrating a drive motor.
Figure 3B:
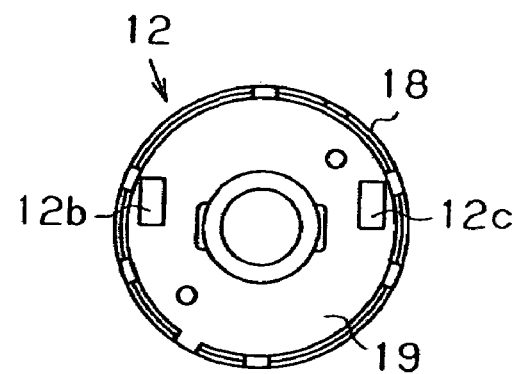
FIG. 3(b) is a right side view illustrating the drive motor shown in FIG. 3(a)
Figure 3C:
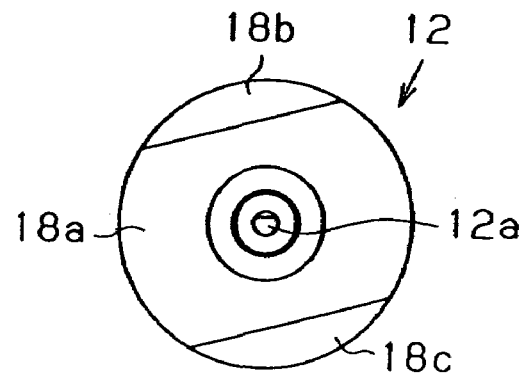
FIG. 3(c) is a left side view illustrating the drive motor shown in FIG. 3(a)

As shown in FIGS. 3(a) to 3(c), the drive motor 12 is substantially columnar. The drive motor 12 includes a cylindrical motor yoke 18, which has a top wall 18a on one end. The opening portion of the motor yoke 18 is closed by an end housing 19.

As shown in FIGS. 3(a) and 3(c), the top wall 18a of the motor yoke 18 has two recessed portions 18b, 18c, which are arranged at radially opposite positions. The drive motor 12 is secured to the lower case 10 such that one of the recessed portions 18c abuts against the inclined portion 20 of the lower case 10. The abutment between the recessed portion 18c and the inclined portion 20 determines the securing angle of the drive motor 12 with respect to the lower case 10 in the circumferential direction. A rotary shaft 12a of the drive motor 12 protrudes from the center of the top wall 18a.

As shown in FIG. 3(b), a pair of plate-like motor terminals 12b, 12c extend from the radially opposite positions of the end housing 19. The motor terminals 12b, 12c are bent in the same direction (upward as viewed in FIGS. 3(a), 3(b)). The surfaces of the motor terminals 12b, 12c facing the end housing 19 closely contact the end housing 19.

Figure 4:
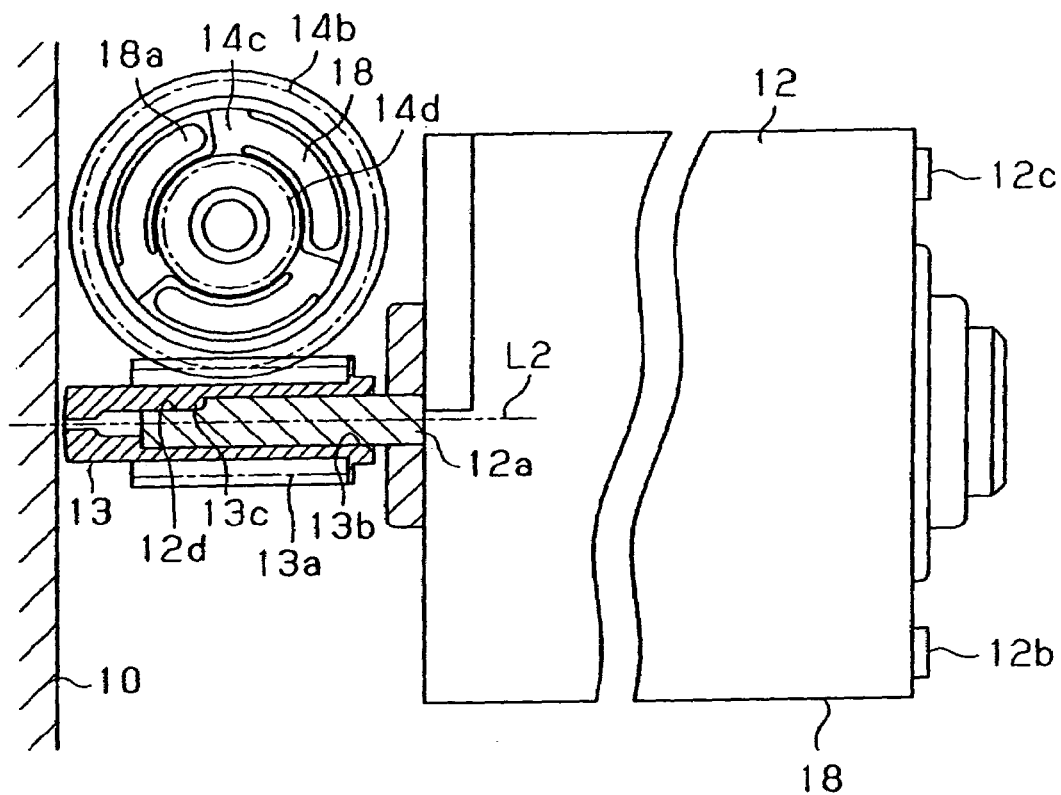
FIG. 4 is a plan view illustrating the drive motor shown in FIG. 3(a) and a first reduction gear.

As shown in FIG. 4, the worm 13 is attached to the rotary shaft 12a of the drive motor 12. The rotary shaft 12a is substantially columnar and protrudes from the motor yoke 18.

A cut-out portion 12d is formed at the distal end of the rotary shaft 12a so that part of the distal end becomes flat. The outer circumferential surface of the distal end of the rotary shaft 12a is substantially D-shaped as viewed from the direction of the axis L2 of the rotary shaft 12a.

The worm 13 is substantially cylindrical. A spiral groove 13a is formed on the outer circumferential surface of the worm 13. The worm 13 has an insertion hole 13b, which extends along the axis of the worm 13. The diameter of the insertion hole 13b decreases step by step toward the distal end (left end in FIG. 4) of the worm 13. The diameter of the insertion hole 13b at the proximal end of the worm 13 is slightly greater than the diameter of the rotary shaft 12a. The worm 13 is slidable against the rotary shaft 12a along the axis L2.

Figure 5:
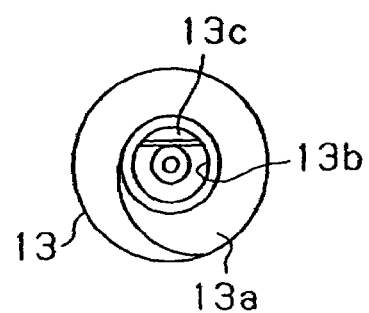
FIG. 5 is a diagram illustrating the worm shown in FIG. 4 as viewed from the axial direction.

As shown in FIGS. 4 and 5, the worm 13 has, inside the insertion hole 13b, a projection 13c, which corresponds to the cut-out portion 12d of the rotary shaft 12a. The cross-section of the portion of the insertion hole 13b corresponding to the projection 13c is D-shaped, which is the same as the cross-section of the portion of the rotary shaft 12a corresponding to the cut-out portion 12d. The worm 13 is attached to the rotary shaft 12a to be rotatable integrally with the rotary shaft 12a by the engagement between the projection 13c and the cut-out portion 12d.

As shown in FIG. 4, the first reduction gear 14 is engaged with the spiral groove 13a of the worm 13. The cut-out portion 12d is located closer to the distal end of the worm 13 than the center of the first reduction gear 14 along the direction of the axis L2 of the rotary shaft 12a.

Figure 6A:
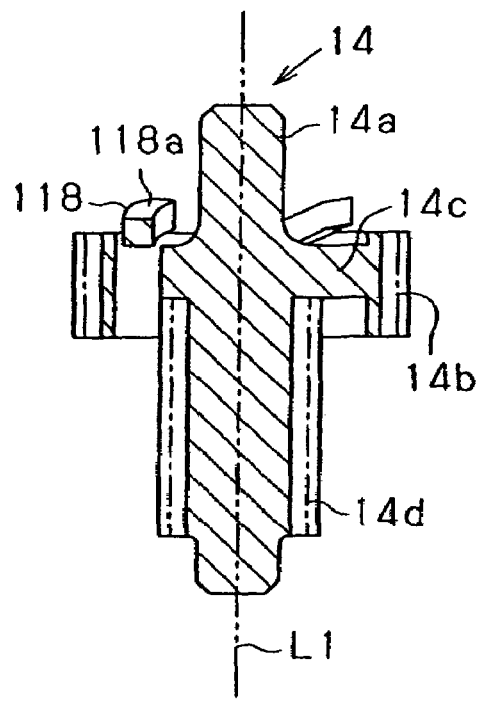
FIG. 6(a) is a front cross-sectional view illustrating the first reduction gear.
Figure 7:
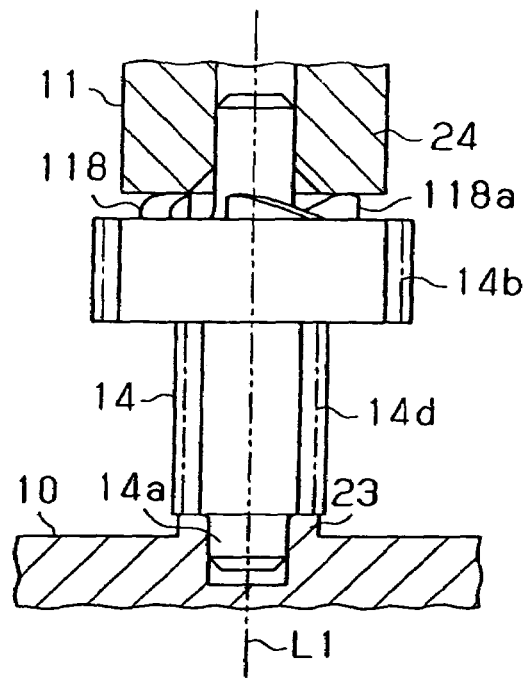
FIG. 7 is a front cross-sectional view illustrating the first reduction gear mounted on a lower case and an upper case.

As shown in FIG. 6(a), the first reduction gear 14 includes a shaft portion 14a. As shown in FIG. 7, the ends of the shaft portion 14a are supported by first bearings 23, 24 (see FIGS. 11(a) and 12(a)) respectively formed at the opposing positions of the lower case 10 and the upper case 11. The shaft portion 14a is pressed by the first bearings 23, 24 from both sides along the direction of the axis L1 of the shaft portion 14a.

The first bearing 23 is cylindrical and projects upward from the bottom wall of the lower case 10. The first bearing 24 is cylindrical and projects downward from the upper wall of the upper case 11. The diameter of the inner circumferential surface of each first bearing 23, 24 is substantially the same as the diameter of the corresponding end portion of the shaft portion 14a.

Figure 6B:
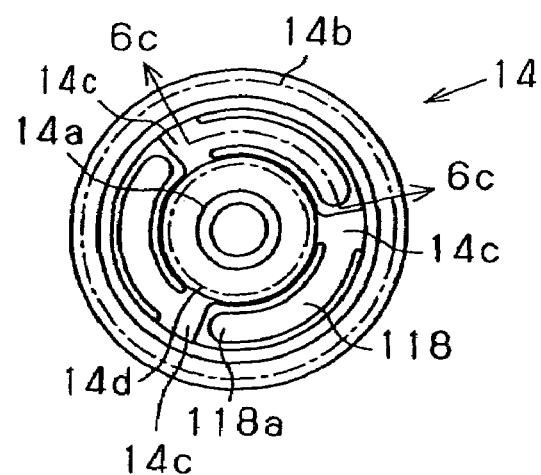
FIG. 6(b) is a plan view illustrating the first reduction gear shown in FIG. 6(a)

As shown in FIGS. 6(a) and 6(b), three coupling portions 14c are arranged at equal angular intervals about the shaft portion 14a and extend radially outward from the shaft portion 14a. A cylindrical gear portion, which is a worm wheel 14b in this embodiment, is integrally coupled to the distal ends of the coupling portions 14c. The worm wheel 14b is engaged with the spiral groove 13a of the worm 13 (see FIG. 4).

Figure 6C:
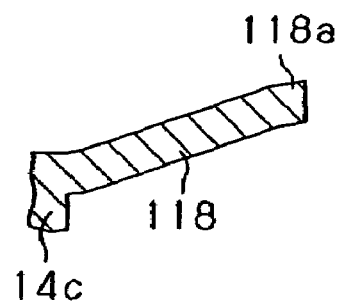
FIG. 6(c) is a cross-sectional view taken along line 6c-6c of FIG. 6(b)

An elastic portion 118 extends along the circumferential direction from substantially the middle section of each coupling portion 14c in the longitudinal direction (the radial direction of the first reduction gear 14). FIG. 6(c) is a cross-sectional view taken along line 6c-6c of FIG. 6(b). Each elastic portion 118 extends from the corresponding coupling portion 14c diagonally upward along the circumferential direction. The inclination of a distal end portion 118a of each elastic portion 118 is slightly gentler than that of the other portion. The upper end face of each elastic portion 118 forms a gently convex surface at the vicinity of the distal end portion 118a. The distal end portion 118a projects above the upper end face of the worm wheel 14b.

The three elastic portions 118 are the same as each other. Therefore, the protruding amounts of the three elastic portions 118 from the upper end face of the worm wheel 14b with respect to the direction of the axis L1 of the first reduction gear 14 are the same. In other words, the distal end portions 118a of the three elastic portions 118 are located on a plane that is perpendicular to the axis L1 of the first reduction gear 14. Also, the three distal end portions 118a are arranged at equal angular intervals about the axis L1.

As shown in FIG. 7, in a state where the first bearings 23, 24 support the first reduction gear 14, the distal end portions 118a of the elastic portions 118 abut against the end face of the first bearing 24 of the upper case 11. The distance between the opposing end faces of the first bearings 23, 24 is set such that the elastic portions 118 are elastically deformed in the direction of the axis L1 by the end face of the first bearing 24. The end face of the first bearing 24 functions as a receiving surface for slidably receiving the elastic portions 118.

Figure 8:
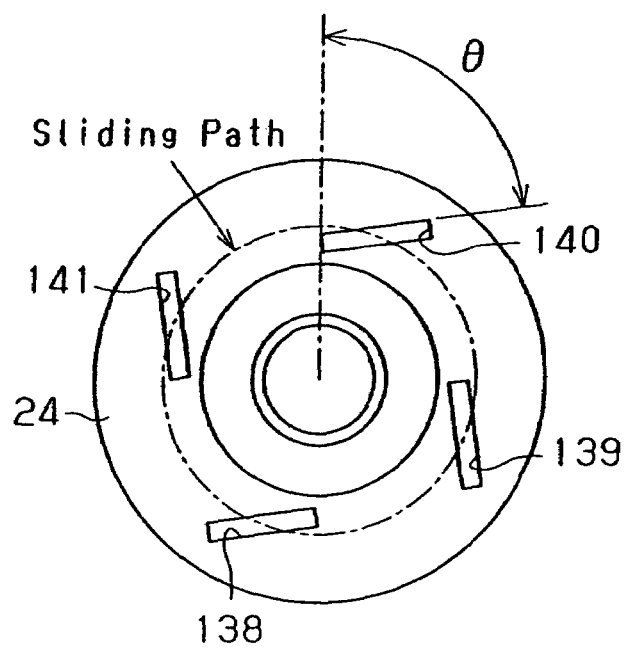
FIG. 8 is a diagram illustrating a first bearing of the upper case as viewed from the axial direction.

As shown in FIG. 8, four recesses, which are grease grooves 138, 139, 140, 141 are formed on the flat end face of the first bearing 24 at equal angular intervals. The grease grooves 138 to 141 accommodate lubricant agent such as grease. A circle drawn by a dashed line in FIG. 8 represents a path along which the distal end portions 118a of the elastic portions 118 slide on the end face of the first bearing 24 as the first reduction gear 14 rotates. The grease grooves 138 to 141 are located on the sliding path of the distal end portions 118a. Each grease groove 138 to 141 is inclined by an angle θ with respect to a radial line that passes through the center of the first bearing 24 and one end of the grease groove As shown in FIG. 6(a), a gear portion 14d is formed on the shaft portion 14a. The number of the teeth of the gear portion 14d is less than that of the worm wheel 14b. The gear portion 14d is engaged with the second reduction gear 15 (see FIG. 13). The gear portion 14d is a small diameter gear portion, and the worm wheel 14b is a large diameter gear portion.

Figure 10A:
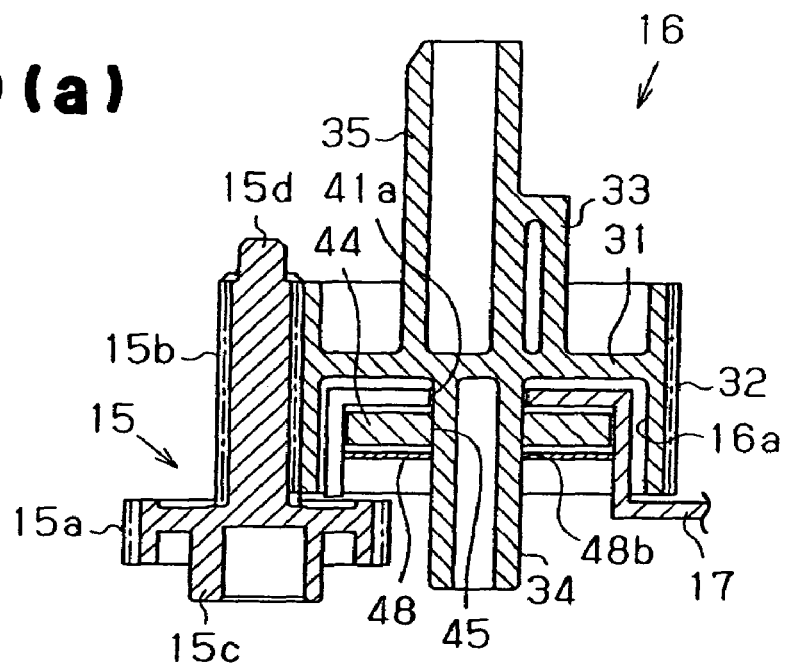
FIG. 10(a) is a front cross-sectional view illustrating a second reduction gear, the third reduction gear, and a sensor accommodating portion.
Figure 10B:
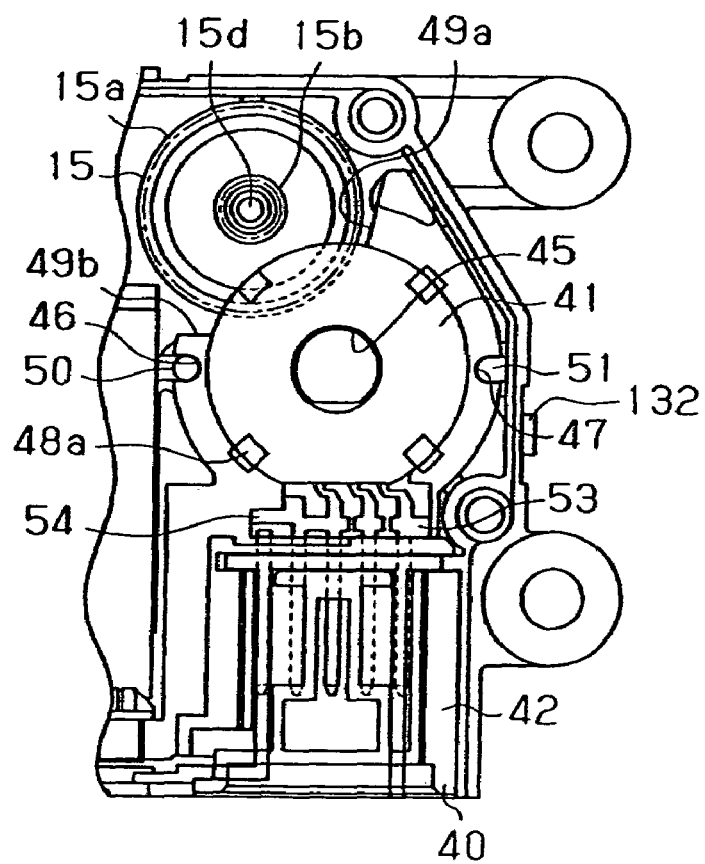
FIG. 10(b) is a partial plan view illustrating the second reduction gear mounted on the lower case and the connector assembly.

As shown in FIGS. 10(a) and 10(b), the second reduction gear 15 includes a first gear portion 15a and a second gear portion 15b. The gear portions 15a, 15b are integrally formed with each other. The number of teeth of the first gear portion 15a is greater than that of the gear portion 14d of the first reduction gear 14. The number of teeth of the second gear portion 15b is less than that of the first gear portion 15a. The first gear portion 15a is engaged with the gear portion 14d of the first reduction gear 14 (see FIG. 13).

As shown in FIG. 10(a), the second reduction gear 15 includes a cylindrical lower shaft portion 15c and an upper shaft portion 15d at its axial ends. The lower shaft portion 15c and the upper shaft portion 15d are supported by second bearings 25, 26 (see FIGS. 11(a) and 12(a)) respectively formed at the opposing positions of the lower case 10 and the upper case 11.

Figure 12A:
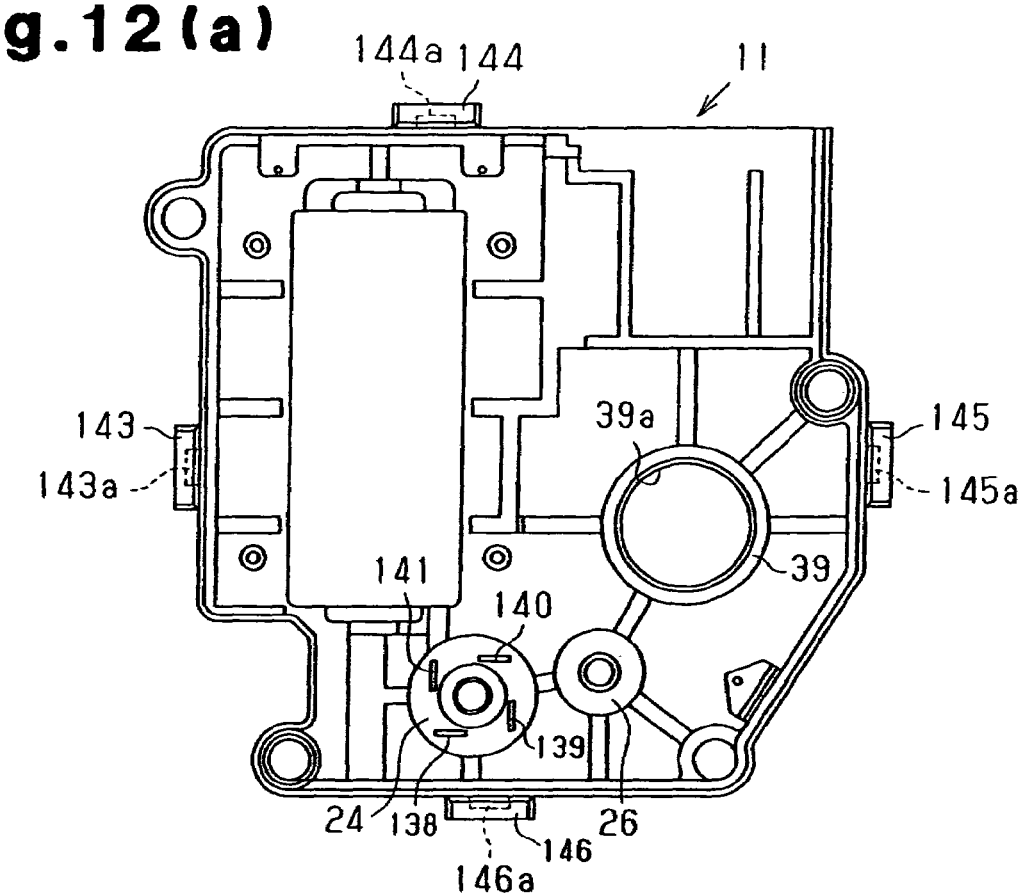
FIG. 12(a) is a bottom view illustrating the upper case.

The second bearing 25 shown in FIG. 11(a) is cylindrical and projects upward from the bottom wall of the lower case 10. The diameter of the inner circumferential surface of the second bearing 25 is substantially the same as the diameter of the outer circumferential surface of the lower shaft portion 15c. The second bearing 26 shown in FIG. 12(a) is cylindrical and projects downward from the upper wall of the upper case 11. The diameter of the inner circumferential surface of the second bearing 26 is substantially the same as the diameter of the upper shaft portion 15d.

Figure 9A:
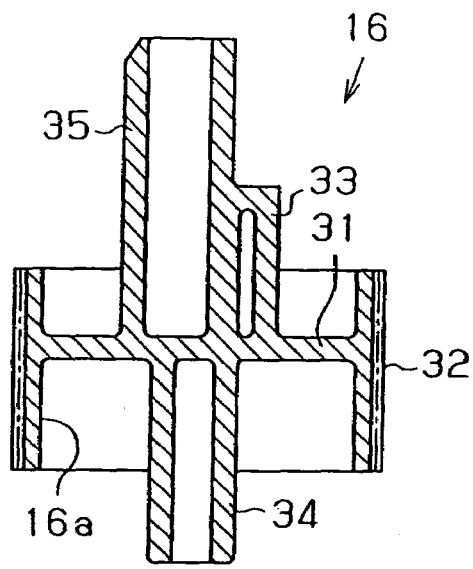
FIG. 9(a) is a front cross-sectional view illustrating a third reduction gear.

As shown in FIG. 10(a), the second gear portion 15b is engaged with the third reduction gear 16. As shown in FIG. 9(a), the third reduction gear 16 includes a disk portion 31, a cylindrical gear portion 32, a cylindrical upper shaft portion 33, and a cylindrical lower shaft portion 34. The gear portion 32 is integrally formed about the disk portion 31 and is engaged with the second gear portion 15b. The upper shaft 33 projects upward from the upper surface of the disk portion 31, and the lower shaft portion 34 projects downward from the lower surface of the disk portion 31. The gear portion 32 extends axially downward beyond the disk portion 31. Therefore, the third reduction gear 16 has a substantially ring-shaped recess 16a, which is defined by the lower surface of the disk portion 31, the inner circumferential surface of the gear portion 32, and the outer circumferential surface of the lower shaft portion 34. The number of teeth of the gear portion 32 is greater than that of the second gear portion 15b of the second reduction gear 15.

Figure 9B:
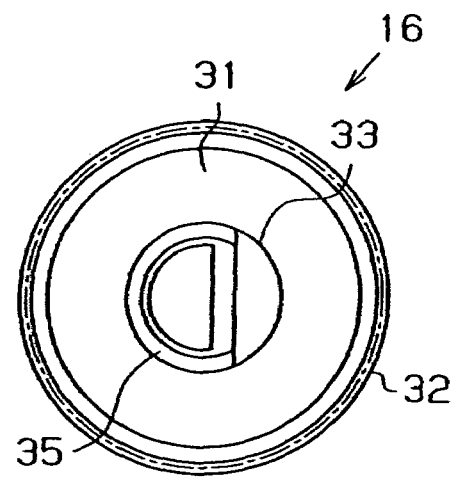
FIG. 9(b) is a plan view illustrating the third reduction gear shown in FIG. 9(a)
Figure 9C:
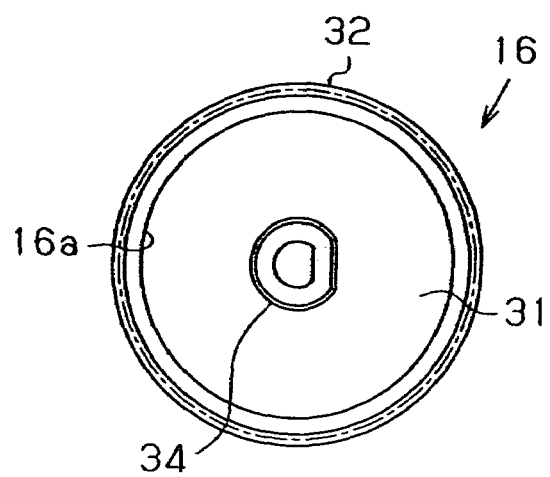
FIG. 9(c) is a bottom view illustrating the third reduction gear shown in FIG. 9(a)

The output shaft 35 extends further upward of the distal end of the upper shaft portion 33. As shown in FIG. 9(b), the outer circumferential surface of the output shaft 35 has a substantially D-shaped cross-section. As shown in FIG. 9(c), the outer circumferential surface of the lower shaft portion 34 also has a substantially D-shaped cross-section.

The lower shaft portion 34 and the upper shaft portion 33 are supported by third bearings 38, 39 (see FIGS. 11(a) and 12(a)) respectively formed at the opposing positions of the lower case 10 and the upper case 11. The third bearing 38 shown in FIG. 11(a) is cylindrical and projects upward from the bottom wall of the lower case 10. The diameter of the inner circumferential surface of the third bearing 38 is substantially the same as the diameter of the outer circumferential surface of the lower shaft portion 34. The third bearing 39 shown in FIG. 12(a) is cylindrical and projects downward from the upper wall of the upper case 11. The diameter of the inner circumferential surface of the third bearing 39 is substantially the same as the diameter of the outer circumferential surface of the upper shaft portion 33.

As shown in FIG. 12(a), the upper wall of the upper case 11 is cut off in a circular form corresponding to the shape of the inner circumferential surface of the third bearing 39 so that an output opening 39a is formed. That is, the output opening 39a is formed continuously to the inner circumferential surface of the third bearing 39. The inner circumferential surface of the third bearing 39 and the output opening 39a form a through hole that extends through the upper case 11.

When the upper shaft portion 33 is inserted in the third bearing 39, the upper end face of the upper shaft portion 33 projects upward from the upper wall of the upper case 11 as shown in FIG. 14. That is, when the actuator device 9 is assembled, the output shaft 35, which extends from the upper shaft portion 33, projects from the upper end face of the actuator device 9. A driven device, which is the dumper in this embodiment, is fitted onto the output shaft 35.

Figure 1:
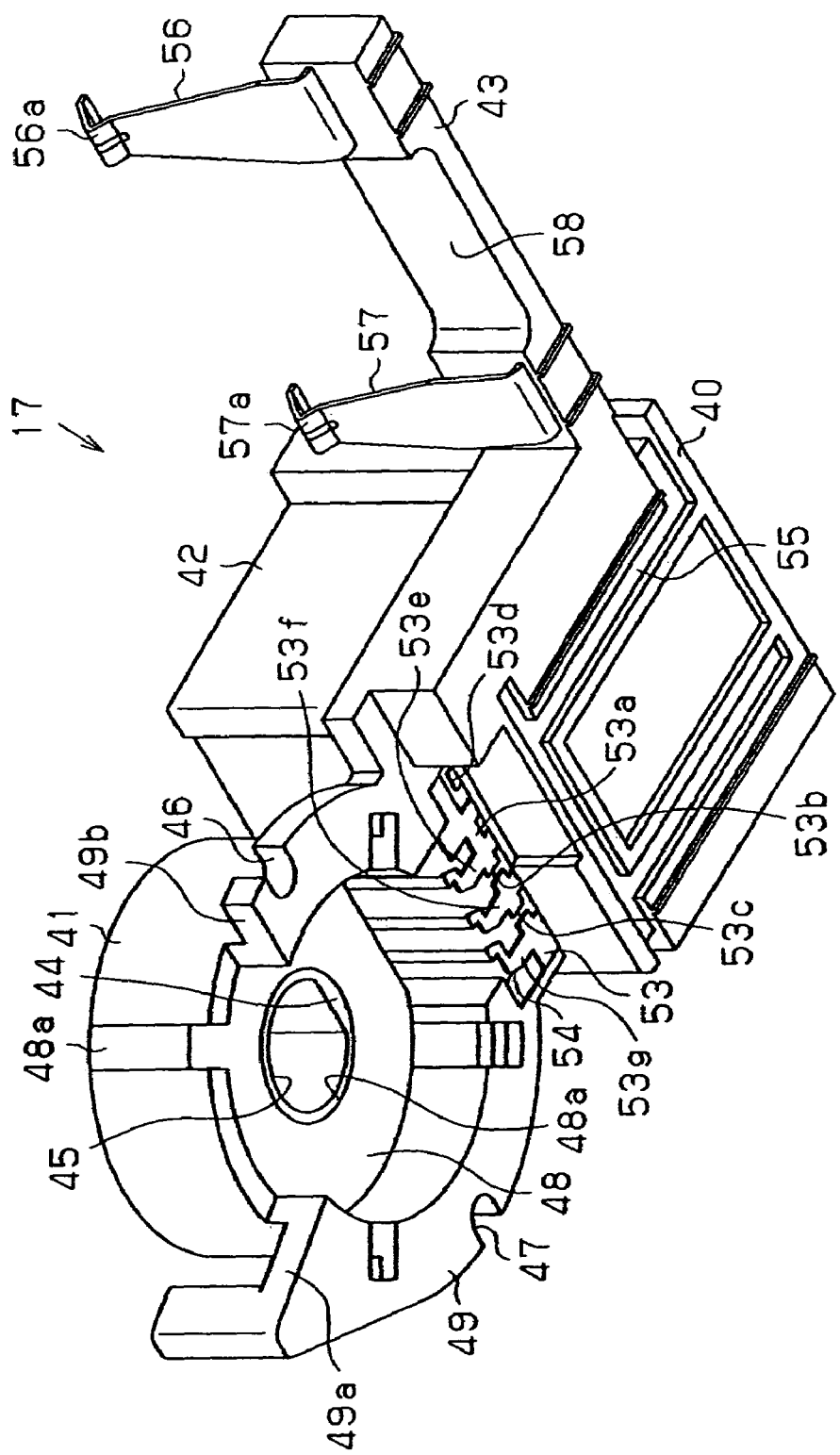
FIG. 1 is a perspective view illustrating a connector assembly according to one embodiment of the present invention.
Figure 2A:
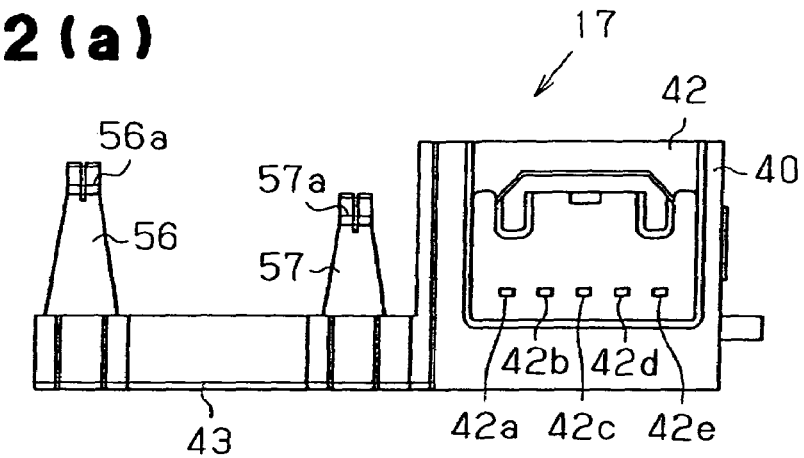
FIG. 2(a) is a front view illustrating the connector assembly shown in FIG. 1.

As shown in FIG. 10(a), the lower shaft portion 34 is mounted on the connector assembly 17. As shown in FIGS. 1 to 2(c), the connector assembly 17 is substantially L-shaped according to a plan view and includes a sensor accommodating portion 41, a connector portion 42, and a power supply portion 43. The sensor accommodating portion 41 is cylindrical and has a top wall at one end. A bore 41a through which the lower shaft portion 34 is inserted is formed at the center of the top wall.

As shown in FIG. 10(a), the sensor accommodating portion 41 rotatably accommodates a substantially ring-shaped sensor 44. The open end of the sensor accommodating portion 41 is closed by a flat plate 48 with the sensor 44 being accommodated. As shown in FIGS. 1 and 10(b), the flat plate 48 is attached to the sensor accommodating portion 41 with hooks 48a formed on the outer rim of the flat plate 48. As shown in FIGS. 1 and 10(a), a bore 48b through which the lower shaft portion 34 is inserted is formed at the center of the flat plate 48.

A press fitting bore 45, which has a substantially D-shaped cross-section, is formed at the center of the sensor 44. The lower shaft portion 34 is press fitted in the press fitting bore 45, and the sensor 44 rotates integrally with the third reduction gear 16. The sensor accommodating portion 41 is accommodated in the recess 16a defined in the third reduction gear 16. The sensor 44 is, for example, a potentiometer that incorporates a variable resistance and detects the rotation angle of the third reduction gear 16. Although not shown in the drawings, a circuit that forms part of the sensor 44 is located in the sensor accommodating portion 41. The circuit does not rotate with the third reduction gear 16 but is secured to the inside of the sensor accommodating portion 41.

Figure 2B:
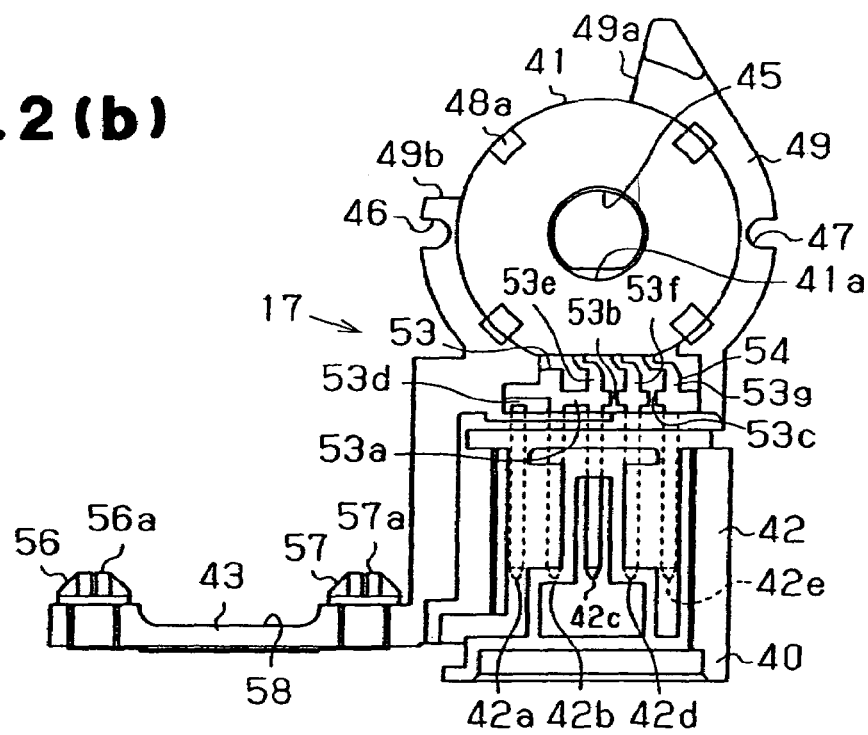
FIG. 2(b) is a plan view illustrating the connector assembly shown in FIG. 1.
Figure 2C:
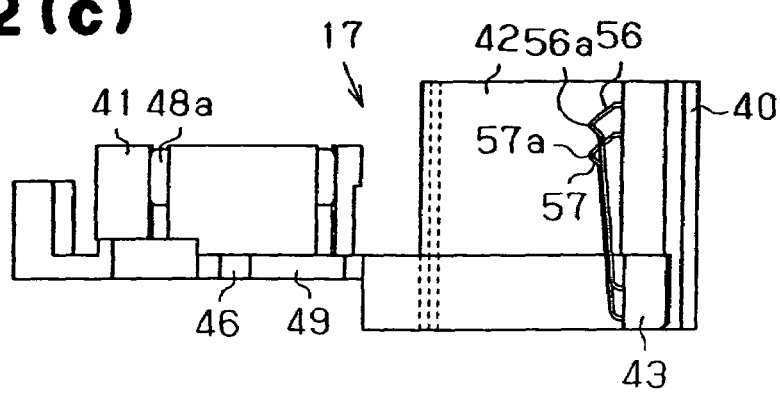
FIG. 2(c) is a side view illustrating the connector assembly shown in FIG. 1.

As shown in FIGS. 1 and 2(b), a flange 49, which extends radially outward, is formed at the opening end of the sensor accommodating portion 41. The flange 49 extends along a predetermined angular range about the opening end. The flange 49 has two cut-out surfaces 49a, 49b. The second reduction gear 15 is located between the cut-out surfaces 49a, 49b as shown in FIG. 10(b).

As shown in FIGS. 1 and 10(b), a pair of positioning recesses 46, 47 are formed on the periphery of the flange 49 at an angular interval of 180 degrees. The positioning recesses 46, 47 are formed by cutting the flange 49 toward the axis of the sensor accommodating portion 41. The positioning recesses 46, 47 are engaged with substantially columnar positioning projections 50, 51 provided on the lower case 10. The positioning projections 50, 51 are located radially opposite to each other with the third bearing 38 (see FIG. 11(a)) in between and project upward from the bottom wall of the lower case 10. The engagement between the positioning recesses 46, 47 and the positioning projections 50, 51 determines the position of the sensor accommodating portion 41 with respect to the lower case 10.

As shown in FIG. 1, the connector portion 42 is coupled to the flange 49 and is formed integrally with the sensor accommodating portion 41. As shown in FIGS. 1 to 2(c), the connector portion 42 includes a connector housing 40. The connector housing 40 is substantially box-shaped. Connector terminals, which are first to fifth connector pins 42a to 42e, are provided in the internal space of the connector housing 40. The connector pins 42a to 42e are integrally incorporated in the connector housing 40.

The connector assembly 17 includes a conductive plate 54. The conductive plate 54 is manufactured by punching out a conductive plate, such as a metal plate, to form a predetermined shape. Part of the conductive plate forms the connector pins 42a to 42e. The conductive plate 54 also has first and second power-supply terminals 56, 57, which extend from the power supply portion 43.

As shown in FIGS. 1 and 2(b), the conductive plate 54 further includes a wiring portion 53. The wiring portion 53 includes first to third coupling portions 53a to 53c, a cut-off portion 53d, and first to third connecting portions 53e to 53g. As shown in FIGS. 1 and 2(b), the cut-off portion 53d exists, and the second and third coupling portions 53b, 53c are cut in the middle. However, at the time when the conductive plate 54 is punched out, the cut-off portion 53d does not exist, and the second and third coupling portions 53b, 53c are not cut as is the case with the first coupling portion 53a. The first to third connecting portions 53e to 53g extend inside the sensor accommodating portion 41 to be connected to the sensor 44. The connecting state among the connecting portions 53e to 54g, the connector pins 42a to 42e, and the power supply terminals 56, 57 can be arbitrarily set in accordance with the configuration of the wiring portion 53.

In the preferred embodiment, the first connector pin 42a is connected to the second power supply terminal 57. The second and third connector pins 42b, 42c are connected to the first power supply terminal 56 and the first connecting portion 53e. The fourth connector pin 42d is connected to the second connecting portion 53f, and the fifth connector pin 42e is connected to the third connecting portion 53g.

The sensor accommodating portion 41, the connector portion 42, and the power supply portion 43 are integrally molded using resin such that the wiring portion 53 of the conductive plate 54 is exposed. Thereafter, the cut-off portion 53d is formed, and an arbitrary one or more of the first to third coupling portions 53a to 53c is cut.

The cut-off portion 53d is provided to electrically disconnect the first connector pin 42a from the wiring portion 53. One or more of the first to third coupling portions 53a to 53c that should be cut is selected in accordance with the type of the sensor 44 accommodated in the sensor accommodating portion 41. In the preferred embodiment, the second and third coupling portions 53b, 53c are cut. The preferred embodiment is applicable to various types of the sensor 44 by selecting one or more of the coupling portions 53a to 53c to be cut.

As shown in FIG. 1, a positioning recess 55 is formed in the lower surface of the connector housing 40. The positioning recess 55 is fitted to a rib 52 (see FIG. 11(a)) provided on the bottom wall of the lower case 10. Fitting of the positioning recess 55 to the rib 52 determines the position of the connector portion 42 with respect to the lower case 10.

As shown in FIGS. 1 to 2(c), the power supply portion 43 is formed integrally with the connector portion 42 to extend sideways from the connector portion 42. The power supply terminals 56, 57 extend from the inside of the power supply portion 43 to the outside of the power supply portion 43. The power supply terminals 56, 57 are formed by bending metal plates. A slit is formed at the distal end of each power supply terminal 56, 57.

As shown in FIGS. 1 and 2(c), the distal end of each power supply terminal 56, 57 is bent to form a substantially V-shape as viewed from sideways. The bent portions of the power supply terminals 56, 57 form abutment portions 56a, 57a. The abutment portions 56a, 57a abut against the motor terminals 12b, 12c (see FIG. 3(b)) of the drive motor 12, respectively. The abutment portions 56a, 57a are formed such that the power supply terminals 56, 57 are elastically deformed while the abutment portions 56a, 57a abut against the motor terminals 12b, 12c. The lengths of the power supply terminals 56, 57 are set such that each abutment portion 56a, 57a properly abuts against the corresponding motor terminal 12b, 12c when the actuator device 9 is assembled. Electric power is supplied to the drive motor 12 from the power supply terminals 56, 57 through the motor terminals 12b, 12c.

As shown in FIGS. 1 and 2(b), the power supply portion 43 has a positioning recess 58 between the power supply terminals 56, 57. The inner corners of the positioning recess 58 are arcuate, and the shape of the positioning recess 58 corresponds to the shape of the motor support portion 22 (see FIG. 11(a)) formed on the lower case 10. The thickness of the power supply portion 43 in the width direction (vertical direction in FIG. 2(b)) is substantially the same as the distance between the motor support portion 22 and the side wall of the lower case 10 facing the motor support portion 22. As shown in FIG. 13, the power supply portion 43 is sandwiched between the motor support portion 22 and the side wall of the lower case 10, which determines the position of the power supply portion 43 in the lower case 10.

The connector assembly 17 formed as described above is held between the lower case 10 and the upper case 11 in a state where an external connector (not shown) can be inserted in the connector portion 42 as shown in FIG. 14. When the external connector is inserted in the connector portion 42, terminals of the external connector are connected to the connector pins 42a to 42e. As a result, drive current and control signals are supplied to the drive motor 12 from the outside and detection signals obtained by the sensor 44 are sent to the outside through the external connector.

Figure 12B:
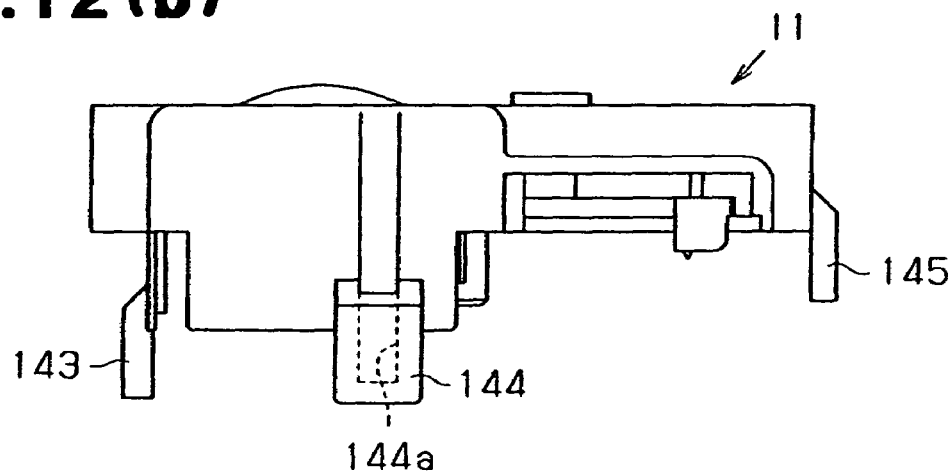
FIG. 12(b) is a front view illustrating the upper case shown in FIG. 12(a)

As shown in FIGS. 11(a) and 11(b), four engaging projections 130 to 133 are formed on the outer surface of the side wall of the lower case 10 to project outward. On the other hand, as shown in FIGS. 12(a) and 12(b), four hooks 143 to 146 are formed on the outer surface of the side wall of the upper case 11 to extend downward. The hooks 143 to 146 correspond to the engaging projections 130 to 133. Each hook 143 to 146 includes a recess 143a to 146a for receiving the corresponding engaging projection 130 to 133.

The engagement of the engaging projections 130 to 133 with the recesses 143a to 146a of the hooks 143 to 146 causes the upper case 11 and the lower case 10 to be attached to each other as shown in FIG. 14.

The operations of the actuator device 9 formed as described above will now be described.

When the drive motor 12 is driven, the worm 13 rotates integrally with the rotary shaft 12a, and the rotation of the worm 13 is transmitted to the first reduction gear 14 (see FIG. 4). As shown in FIG. 7, the elastic portions 118 depress the first reduction gear 14 along the axis L1 toward the first bearing 23 of the lower case 10 and press the first reduction gear 14 against the first bearing 23. Therefore, frictional resistance caused between the first reduction gear 14 and the first bearing 23 is relatively large.

When the frictional resistance between the first reduction gear 14 and the first bearing 23 is increased, torque of the drive motor 12 required to transmit rotation to the first reduction gear 14 is increased. The worm 13 needs to transmit torque to the first reduction gear 14 by force that is increased by an amount that is equivalent to the amount of the increased frictional resistance.

On the other hand, as the torque transmitted from the worm 13 to the first reduction gear 14 is increased, a reactive force corresponding to the increased torque is applied to the worm 13 from the first reduction gear 14. The reactive force is applied at the engaged portion between the first reduction gear 14 and the worm 13 in the radially outward direction (downward in FIG. 4) of the first reduction gear 14.

The rotary shaft 12a of the drive motor 12, which is inserted in the insertion hole 13b of the worm 13, also receives the reactive force from the first reduction gear 14. Therefore, the rotary shaft 12a is rotated while being urged in a direction along which the reactive force is applied (downward in FIG. 4).

The preferred embodiment provides the following advantages.

The sensor accommodating portion 41, the connector portion 42, and the power supply portion 43, which form the connector assembly 17, are integrally formed (see FIG. 1). Therefore, the number of processes for assembling the actuator device 9 is reduced and the actuator device 9 is easily manufactured.

The sensor accommodating portion 41 is accommodated in the substantially ring-shaped recess 16a defined inside the gear portion 32 of the third reduction gear 16 (see FIG. 10(a)). Therefore, a space for accommodating the sensor 44 is provided inside the gear portion 32. This miniaturizes the actuator device 9.

The connector assembly 17 is substantially L-shaped according to a plan view (see FIG. 2(b)). Therefore, the overall size of the connector assembly 17 is decreased, which miniaturizes the actuator device 9.

A wiring configuration appropriate for the sensor 44 to be used is provided by arbitrarily selecting one or more of the coupling portions 53a to 53c to be cut in accordance with the type of the sensor 44 to be used. Therefore, for example, instead of the potentiometer type sensor 44, a pulse encoder type sensor, which detects the rotation angle of the output shaft 35 at high resolution by forming digital signals from output pulses, or a sensor that detects rotation angle of the output shaft 35 in two ways by ON/OFF signals, may be used. In these cases also, the sensor 44 can be accommodated in the common connector assembly 17. Thus, the connector assembly 17 need not be changed in accordance with the type of the sensor 44. This improves the versatility of the connector assembly 17.

A desired wiring configuration is achieved by cutting any of the coupling portions 53a to 53c that are not cut. Therefore, it is not necessary to perform a connecting process such as soldering to achieve the desired wiring configuration. This suppresses the use of lead.

The motor terminals 12b, 12c, which extend from the end housing 19, are bent such that the surfaces of the motor terminals 12b, 12c that face the end housing 19 closely contact the end housing 19 (see FIGS. 3(a) and 3(b)). Therefore, the actuator device 9 is miniaturized in the axial direction of the drive motor 12.

The motor terminals 12b, 12c closely contact the end housing 19 and are pressed against the end housing 19 by the abutment portions 56a, 57a of the power supply terminals 56, 57. As a result, the resonance point of the motor terminals 12b, 12c is increased and the resonance in the vicinity of 1 kHz, which is offensive to the ear, is avoided.

The drive motor 12 is secured to the lower case 10 such that the recessed portion 18c of the motor yoke 18 abuts against the inclined portion 20 formed on the lower case 10. Therefore, the position of the drive motor 12, which has a columnar outline, is reliably determined in the circumferential direction.

The wiring portion 53 is connected to the sensor 44 in the sensor accommodating portion 41. When molding the connector assembly 17, the position of the wiring portion 53 with respect to the sensor accommodating portion 41 is easily confirmed.

The connector portion 42 includes the connector housing 40. The connector pins 42a to 42e are embedded in the connector housing 40 when molding the connector housing 40. Therefore, the connector pins 42a to 42e need not be separately incorporated when assembling the actuator device 9.

The connector pins 42a to 42e and the power supply terminals 56, 57 are formed integrally with the conductive plate 54 as part of the conductive plate 54. Therefore, the connector pins 42a to 42e and the power supply terminals 56, 57 need not be separately connected.

The elastic portions 118 integrally formed with the first reduction gear 14 depress the first reduction gear 14 along the axis L1 (see FIG. 7). The first reduction gear 14 is depressed along the axis L1 without using a separate member such as a spring washer or the like. Therefore, the number of components is reduced and the assembling process is simplified, which reduces the manufacturing cost of the actuator device 9.

The rotary shaft 12a rotates in a state where the rotary shaft 12a is urged radially outward (downward in FIG. 4) of the worm wheel 14b, in other words, in a direction that intersects the axis of the rotary shaft 12a. Therefore, the rotary shaft 12a rotates while being pressed against a bearing (not shown) provided in the drive motor 12 in the radial direction. Thus, backlash of the rotary shaft 12a with respect to the bearing in the drive motor 12 is suppressed, thereby suppressing noise caused by the backlash and the vibration of the rotary shaft 12a.

The elastic portions 118 are integrally formed with the coupling portions 14c, which extend radially outward from the shaft portion 14a of the first reduction gear 14 (see FIGS. 6(a) to 6(c)). The elastic portions 118 are located radially outward of the gear portion 14d formed on the shaft portion 14a. This permits a mold to be divided along the axis L1 of the first reduction gear 14 when molding the first reduction gear 14 including the elastic portions 118. Accordingly, the first reduction gear 14, which integrally includes the elastic portions 118, is easily formed.

The distal end portions 118a of the three elastic portions 118 are located on a plane that is perpendicular to the axis L1 of the first reduction gear 14. The three distal end portions 118a are arranged at equal angular intervals about the axis L1. Therefore, the elastic portions 118 provide the first reduction gear 14 with a stable load in a well-balanced manner along the axis L1.

The elastic portions 118 are formed on the coupling portion 14c, which extend radially outward from the shaft portion 14a. Therefore, the lengths of the elastic portions 118 can be relatively increased in the circumferential direction of the first reduction gear 14. In other words, the setting range of the lengths of the elastic portions 118 can be increased, thereby permitting the level of the pressure exerted by the elastic portions 118 to be easily set.

The grease grooves 138 to 141, which accommodate lubricant agent such as grease, are formed on the end face of the first bearing 24 to be located on a path along which the distal end portions 118a of the elastic portions 118 slide (see FIG. 8). Therefore, lubricant agent is automatically applied to the distal end portions 118a when the first reduction gear 14 is rotated. Thus, the first reduction gear 14 is rotated smoothly.

The grease grooves 138 to 141 extend to incline with respect to the radial direction of the first bearing 24. Therefore, the distal end portions 118a of the elastic portions 118 are prevented from being caught by the grease grooves 138 to 141 when sliding above the grease grooves 138 to 141.

The rotary shaft 12a rotates integrally with the worm 13 by the engagement between the projection 13c provided in the insertion hole 13b and the cut-out portion 12d formed on the rotary shaft 12a (see FIG. 4). Therefore, as compared to a case where a collar is press-fitted in the rotary shaft 12a to prevent rotation of the worm 13, the number of components is reduced, and the actuator device is miniaturized by shortening the dimension of the rotary shaft 12a in the direction of the axis L2.

The cut-out portion 12d is located closer to the distal end of the worm 13 than the center of the first reduction gear 14 along the direction of the axis L2 of the rotary shaft 12a (see FIG. 4). That is, the projection 13c of the worm 13, which is engaged with the cut-out portion 12d, is located closer to the distal end of the worm 13 than the engaged portion between the first reduction gear 14 and the worm 13. The thickness of the part of the worm 13 corresponding to the projection 13c is not constant in the circumferential direction. Therefore, the part of the worm 13 corresponding to the projection 13c is likely to cause deformation when molding the worm 13 with resin. Contrarily, part of the worm 13 where the thickness is constant in the circumferential direction is unlikely to cause deformation. In the preferred embodiment, the worm 13 is engaged with the first reduction gear 14 at the part where deformation is minimum. This suppresses vibration of the rotary shaft 12a due to deformation of the worm 13 and noise caused by the vibration of the rotary shaft 12a.

The worm 13 is slidable against the rotary shaft 12a along the axis L2. Therefore, even if force is applied to the worm 13 along the axis L2, the force is not easily transmitted to the rotary shaft 12a. Thus, noise and vibration caused by the axial movement of the rotary shaft 12a are suppressed.

When the first reduction gear 14 is supported by the first bearings 23, 24, the elastic portions 118 abut against the first bearing 24 of the upper case 11 with gently convex surfaces. Therefore, the elastic portions 118 are prevented from being caught by the first bearing 24 when the first reduction gear 14 is rotated in either direction.

The above embodiments may be modified as follows.

In the preferred embodiment, the actuator device 9 receives control signals from the outside and detection signals obtained by the sensor 44 are sent to the outside through the external connector, which is connected to the connector portion 42. However, a communication IC may be mounted on the actuator device 9 to communicate signals wirelessly or through wires.

The number of the connector pins 42a to 42e located on the connector portion 42 need not be five, but may be less than or equal to four, or greater than or equal to six.

The number of the reduction gears of the reduction mechanism need not be three but may be changed as required.

In the preferred embodiment, the first reduction gear 14 is engaged with the second reduction gear 15, and the second reduction gear 15 is engaged with the third reduction gear 16. However, the first reduction gear may be engaged with the second and third reduction gears.

In the preferred embodiment, the driven device is fitted onto the output shaft 35 of the third reduction gear 16. Instead, the output shaft may have a recess in which the driven device is inserted.

The number of the elastic portions 118 provided on the first reduction gear 14 need not be three but may be changed as required.

Contrary to FIG. 7, the elastic portions 118 may be depressed by the bearing provided on the lower case 10.

The shape of the grease grooves 138 to 141 may be changed to any shape, such as a hemispherical recess, as long as the lubricant agent can be accommodated.

The number of the grease grooves 138 to 141 need not be four, but may be changed as required.

The lubricant agent accommodated in the grease grooves 138 to 141 need not be grease.

In the preferred embodiment, the elastic portions 118 are formed on the first reduction gear 14. However, elastic portions may be integrally formed with the second reduction gear 15 or the third reduction gear 16 as long as the torque for rotating the first reduction gear 14 is constantly maintained to be greater than or equal to a predetermined value.

The invention claimed is:

1. An actuator device, comprising:
   a device housing;
   a drive motor located in the device housing;
   a power transmission mechanism located in the device housing and is coupled to the drive motor;
   an output shaft coupled to the power transmission mechanism, rotation of the drive motor is transmitted to the output shaft via the power transmission mechanism;
   a sensor for detecting the rotation angle of the output shaft;
   a sensor accommodating portion for accommodating the sensor;
   a connector portion including a connector housing and a connector terminal, which is incorporated in the connector housing; and
   a power supply portion including a power supply terminal, which is connected to the drive motor and supplies electric power to the drive motor,
   wherein the power supply terminal and the sensor are electrically connected to the connector terminal, electric power is supplied to the drive motor from the outside via the connector terminal and the power supply terminal, and a rotation angle signal obtained by the sensor is sent to the outside via the connector terminal,
   wherein the sensor accommodating portion, the connector portion, and the power supply portion are integrally formed to form a single assembly mounted on the device housing, and
   wherein the power transmission mechanism includes a plurality of gears, one of the gears has the output shaft and includes a recess for accommodating the sensor accommodating portion.

2. The actuator device according to claim 1, wherein the device housing includes a first case and a second case, and when the assembly is mounted on the device housing, the first case and the second case hold the connector portion.

3. The actuator device according to claim 1, wherein the device housing includes a first case and a second case, and when the assembly is mounted on the device housing, the first case and the second case hold the connector housing.

4. The actuator device according to claim 1, wherein the gear having the recess has a cylindrical gear portion, and the cylindrical gear portion defines the recess.

5. The actuator device according to claim 1, wherein the sensor is coupled to the output shaft to rotate integrally with the output shaft in the recess.

6. The actuator device according to claim 1, wherein the assembly is substantially L-shaped.

7. The actuator device according to claim 1, wherein the sensor accommodating portion, the connector portion, and the power supply portion are molded using resin to form the assembly.

8. The actuator device according to claim 7, wherein the power supply terminal and the connector terminal are integrally incorporated in the assembly.

9. The actuator device according to claim 1, wherein the power supply terminal and the connector terminal are formed of a single conductive plate, the conductive plate further including a wiring portion, the wiring portion including a connecting portion, which is connected to the sensor, and a coupling portion, which can be arbitrarily cut, and the connecting state among the connecting portion, the connector terminal, and the power supply terminal is determined in accordance with the cutting state of the coupling portion.

10. The actuator device according to claim 9, wherein the assembly is molded using resin such that the conductive plate is integrally incorporated.

11. The actuator device according to claim 10, wherein the assembly is molded such that the wiring portion is exposed to the outside.

12. The actuator device according to claim 1, wherein the power transmission mechanism includes a motor gear attached to the rotary shaft of the drive motor and a plurality of gears forming a series of gears coupled to the motor gear, and at least one of the gears, which form the series of gears, integrally includes a depression portion for depressing the gear in the axial direction.

13. The actuator device according to claim 12, wherein the gear including the depression portion has a shaft portion, and the depression portion is located radially outward of the shaft portion.

14. The actuator device according to claim 13, wherein the gear including the depression portion further includes:
   a small diameter gear portion located on the shaft portion;
   a cylindrical large diameter gear portion located radially outward of the shaft portion; and
   a coupling portion, which radially extends between the shaft portion and the large diameter gear portion to integrally couple the large diameter gear portion to the shaft portion,
   wherein the depression portion extends from the coupling portion in the circumferential direction of the corresponding gear.

15. The actuator device according to claim 14, wherein the motor gear is a worm, and the large diameter gear portion is a worm wheel engaged with the worm.

16. The actuator device according to claim 12, wherein the gear including the depression portion has a small diameter gear portion and a large diameter gear portion, which are integrally formed with each other, and the depression portion is provided on the large diameter gear portion to be located radially outward of the small diameter gear portion.

17. The actuator device according to claim 12, wherein the depression portion is one of a plurality of depression portions arranged at equal angular intervals about the axis of the corresponding gear.

18. The actuator device according to claim 12, wherein the device housing has a receiving surface for slidably receiving the depression portion, the receiving surface has a recess for accommodating lubricant agent at a position corresponding to a sliding path of the depression portion.

19. The actuator device according to claim 18, wherein the recess of the receiving surface is groove-like and extends to be inclined with respect to the radial direction of the corresponding gear.

20. The actuator device according to claim 1, wherein the sensor accommodating portion has an open end, the actuator device further comprising a lid which closes the open end of the sensor accommodating portion and is located in the recess.

* * * * *